United States Patent

[11] 3,530,882

[72] Inventors Versie Case
4729 Banks, New Orleans, Louisiana 70119;
James Migliaccio, 1435 Cherokee, Metairie, Louisiana 70005
[21] Appl. No. 740,051
[22] Filed June 26, 1968
[45] Patented Sept. 29, 1970

[54] SAFETY CHECK VALVE FOR VEHICLE BORNE LIQUID TANKS
10 Claims, 4 Drawing Figs.
[52] U.S. Cl. ............................................. 137/588, 137/202
[51] Int. Cl. .............................................. F16k 45/00
[50] Field of Search ................................. 137/588, 202, 516.25, 533.11

[56] References Cited
UNITED STATES PATENTS
| | | | |
|---|---|---|---|
| 2,909,186 | 10/1959 | Larson | 137/202 |
| 2,941,542 | 6/1960 | Jacobson | 137/533.11X |
| 3,388,714 | 6/1968 | Rau | 137/202 |

Primary Examiner—M. Cary Nelson
Assistant Examiner—William R. Cline
Attorney—William E. Ford

ABSTRACT: The invention includes an outer shell to seat centrally through a manhole plate and an inner shell, to seat sealably within the outer shell, and providing at lower end an upper valve seat above a lower valve seat provided by the lower, tapered, open end of the outer shell. A ball valve seats upwardly to avoid escape of tank contents upwardly through an inner shell, and seats downwardly so that atmospheric air may pass down the inner shell and upwardly and out through openings in an outer shell, thus to avoid vacuum being pulled in the evacuation of the tank by a pump.

Patented Sept. 29, 1970
3,530,882
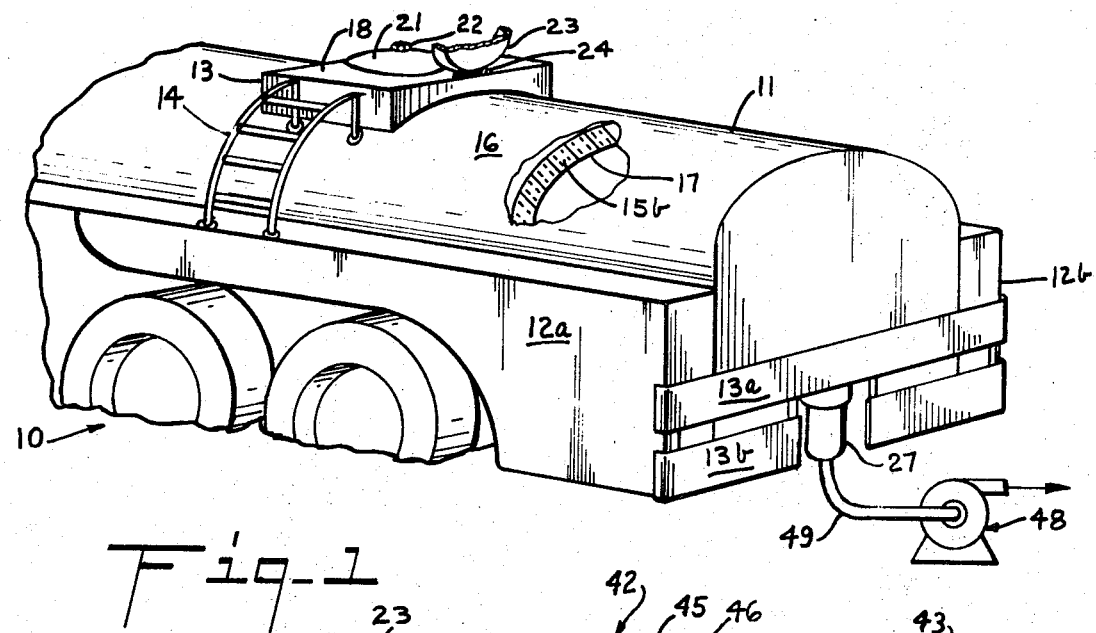
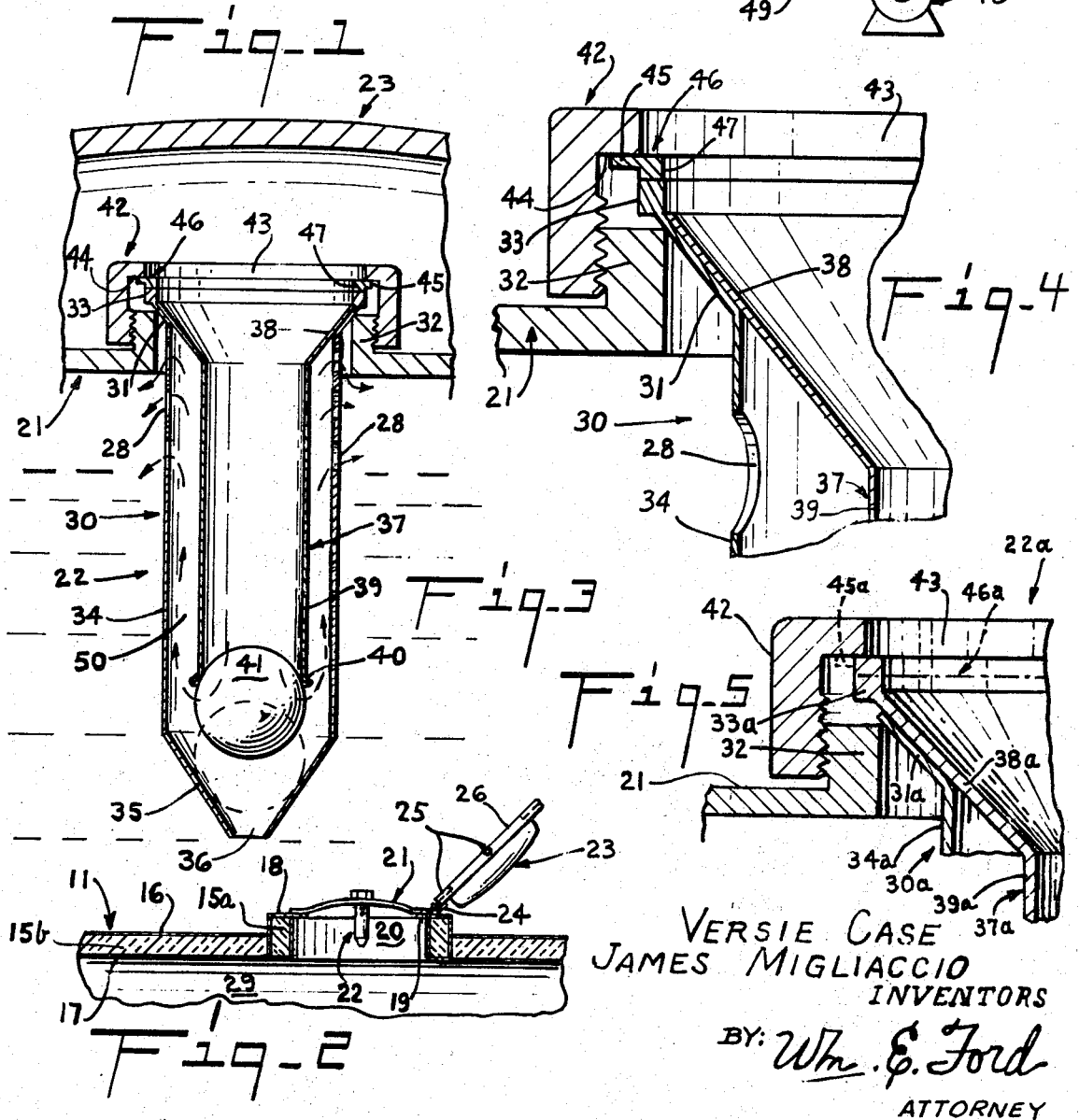
VERSIE CASE
JAMES MIGLIACCIO
INVENTORS
BY: Wm. E. Ford
ATTORNEY

SAFETY CHECK VALVE FOR VEHICLE BORNE LIQUID TANKS

SPECIFICATION

The invention relates to a safety check valve, as for installation in the manhole plate that otherwise seals the manhole opening into a vessel or tank.

As a primary object the invention provides a safety check valve that is resistant to corrosion and other factors, and that will operate to prevent fluid escape from the tank or vessel in transit, as due to splash or built up pressure, and that will operate to let in air to prevent the build up of vacuum, as when the tank or vessel is being evacuated by a pump.

It is another object of the invention to provide a safety check valve of this class which does not require manual operation to be set effective to let atmospheric air into a vessel or tank to oppose the build up of vacuum therein, as when the tank or vessel is being evacuated; and which will close automatically to prevent escape of fluid content from the tank or vessel, as by splash or due to pressure build up therein.

It is also a further object of the invention to provide a safety check valve of this class which may be incorporated into the manhole plate which otherwise sealably closes the manhole passage into a vessel or tank.

It is still another object of the invention to provide a safety check valve of this class in which the uppermost structure thereof above the manhole plate, may comprise a top ring that is integral with the outer shell of the valve, with a separate spacer ring or flange thereabove on which the assembly cap bears, or in which the uppermost structure may comprise, integrally with the outer shell, a cylindrical construction with a flange at top to extend under the assembly cap in assembly.

Other and further objects will be apparent when the specification herein is considered with relation to the drawings, in which:

FIG. 1 is an isometric view of a vehicle borne tank showing relative location of safety check valve in manhole plate;

FIG. 2 is a sectional elevational view through manhole enclosure, showing manhole lid, plate and safety check valve;

FIG. 3 is a sectional elevation through the safety check valve;

FIG. 4 is an enlarged, fragmentary sectional elevational view showing construction details of manhole plate, valve outer and inner shells, and assembly cap; and FIG. 5 is an enlarged, fragmentary sectional elevational view showing alternate construction details of the manhole plate, valve outer and inner shells, and assembly cap.

Referring now in detail to the drawings in which like reference numerals are applied to like elements in the various views, a liquid container or vessel is shown in FIG. 1 as comprised of a milk truck tank 11 mounted to the rear of the truck cabin, not shown, of a motor vehicle or truck 10. The tank 11 extends with axis longitudinally disposed between side compartments 12a, 12b, with parallel extending crossplates 13a, 13b extending across the rear of the side compartments 12a, 12b to restrain the tank 10 against rearward displacement.

A ladder 14 is shown extending from the left compartment 12a to terminate adjacent a manhole enclosure 13, which is outwardly of rectangular or square cross section, the enclosure being disposed centrally of, and upon top of, the tank 11. The inner wall 14 of the manhole enclosure 13 is of cylindrical shape, as indicated in FIG. 2, with an insulative material 15a being interposed between the wall 14 and the enclosure 13 outwardly thereof. Also the tank 11 includes an outer hull 16 with an inner hull or liner 17 inwardly thereof to retain insulation 15b thereinbetween.

The top plate 18 of the enclosure 13 is shown extending inwardly over the manhole opening 20 to provide an annular flange 19 on which seats the manhole cover plate 21, which has the manhole control valve 22 centrally disposed therein. A manhole cover lid 23 is shown in FIG. 2 as hingedly connected by hinge means 24 to the enclosure top plate 18 just outwardly of the manhole cover plate 21.

The contact between the manhole cover plate 21 and the enclosure top plate 18 is air tight, but it is desirable that the manhole cover lid 23 should be constructed to admit atmospheric air into the space under the manhole cover lid 23 and above the manhole cover plate 21, and for this purpose slots 25 are shown in FIG. 2 as extending radially inwardly from the outer edge or periphery of the manhole cover lid flange 26. Various other conventional arrangements of manhole enclosure top, manhole cover plate, and manhole cover lid may be provided, wherein the manhole cover plate seats airtightly upon the enclosure top while air is admitted between the manhole cover lid and the manhole cover plate.

Referring now to FIGS. 1 and 2, together with the detailed relationships shown in FIGS. 3 and 4, the special and novel construction of the valve 22 may be appreciated. Such valve 22 is installed centrally within the manhole cover plate 21 to extend downwardly into the manhole enclosure opening 20 which communicates with the tank interior 29 therebelow; the valve outer shell 30 having upwardly and inwardly and downwardly tapered part 31 to seat on the inner corner of an externally threaded, annular rim or flange 32 which is provided to extend upwardly, centrally from the manhole cover plate 21. Above the tapered part 31 the outer shell terminates upwardly in an annular rim or ring 33, and below the tapered part 31 the outer shell 30 extends downwardly as a cylindrical or tubular body 34. As lowermost member, below the tubular body 34 the outer shell 30 terminates downwardly in a frusto-conical lower part 35, with smaller diameter downwardly, so that the part 35 provides the opening 36.

The valve 22 also includes an inner shell 37 which has upwardly a frusto-conical part 38, tapered downwardly and inwardly, and concentric with the outer shell tapered part 31 to seat therein. The inner shell tapered part 38 connects downwardly with the inner shell tubular body or cylindrical part 39, which extends downwardly concentrically within the outer tubular body 34 and terminates downwardly in an outwardly flared, upper valve seat 40, for a ball valve 41. The ball valve 41 is of predetermined diameter to seat upwardly against the flared valve seat 40 to prevent splash liquid escape, and as the tank interior may be pressurized, also to drop down under pressure from above to seat within the frusto-conical, outer shell lower part 35, as under gravity, or when air is drawn in, the ball valve 41 then occupying the dotted line position shown in FIG. 3.

To tightly assemble the valve 27, a cap 42, open centrally through the top 43, is threaded upon the annular rim or flange 32 of the manhole cover plate 21 with the under surface 44 of the cap 42, outwardly of the opening 43 overlapping and binding upon the upper surface inner corner of flange part 45 of an uppermost, or spacer flange 46, with the lower, annular or cylindrical ring part 47 bearing upon the annular ring or rim 33 comprising the top part of the outer shell 30, as best shown in FIG. 4.

If the liquid, as milk, in the milk tank of a vehicle as a truck, is shaken up in transit, or if a pressure area should develop above the liquid in the tank, the ball valve 41 is urged upwardly to seat upon the flared seat 40. Thus the liquid cannot escape upwardly through the inner shell 37 but must return upwardly through the annular space 50 and outwardly through the holes or ports 28 to fall back into the tank 11.

The liquid cargo in a tank 11 is most frequently drawn out at the end of a trip, or at a destination, by some applied mechanical means to save time, and not simply by opening a drain spigot. As shown in FIG. 1, a discharge connection or drain valve 27 has a hose 49 extending therefrom to a suction pump 48, which discharges through a discharge conduit 51 to any desired point of delivery, as where milk is to be bottled. Conventionally, an operator would have to get up on the ladder 14 and raise the manhole cover lid of a conventional tank, and open a valve in the center of a manhole plate to admit air to be pulled into the tank, or otherwise the pump 48 would build up a vacuum within the tank 11, which would first react to this vacuum, as by the liner 17 being caved in.

With the present invention, there is no need for an operator to open the safety check valve or control valve 22 and the pump 48 can be connected directly to evacuate the tank at any location without delay. As the pump 48 draws the liquid, as milk, from the tank interior 29, the suction thereof draws the ball valve 41 from its upper seat 40 to seat downwardly in the lower valve seat or frusto-conical lower part 35 of the outer shell 30. Thus atmospheric air is drawn in from under the manhole cover lid 23 to pass upwardly around the flared seat 40 and through the space 50 between outer and inner shells 30, 37 and out through the holes or openings 28 in the outer shell 30, thus to break the vacuum in the tank 11. Thereby the tank 11 may be evacuated by the pump 48 without the difficulty of ever pulling against vacuum and with safety as to the tank liner and hull.

Obviously, the hereinabove described safety check valve 22 may include the manhole plate 23 with which it is assembled, as an integrated saleable part thereof, including its hinge connection to the top 18 of the manhole enclosure 13. Also, all parts thereof may best be of materials to resist corrosion and other factors, with stainless steel being mentioned as a most satisfactory material of construction. Also, obviously, the invention is subject to various variations of construction. As, for example, the spacer, flange or ring 46, and the annular rim or ring 33 at the top of the outer shell 30, may be formed together as a single part of the outer shell, or the elements 33 and 46 may be separate members as shown in FIGS. 3 and 4.

As to construction of the cooperative outer shell and inner shell of the check valve combination, variation from that hereinabove described is included by the invention, in that an outer shell 30a, FIG. 5, may terminate upwardly in an outwardly flared or tapered top part 31a, above its tubular body 34a, corresponding with the tubular body 34 and parts therebelow, FIG. 3, in all other particulars. Also, the inner shell 37a, FIG. 5, differs from the construction shown in FIG. 3 in that an annular ring or rim 33a is constructed integrally with, or firmly adjoined to the frusto-conical or outwardly flared or tapered part 38a at the top thereof. The ring 33a is indicated in FIG. 5 as being of outer diameter greater than the cap top opening 43 in the cap 42.

Thus when the cap 42 is threaded full down upon the externally threaded rim or flange 32 which is centrally disposed in the center of the manhole cover plate 31, the inner shell tapered part 38a firmly seats in the outer shell tapered part 31a, as the outer shell tapered part 31a seats firmly upon the inner corner surface ring or rim of the annular flange 32 at the top of the aforesaid manhole cover plate 21. Thus the valve 22a is firmly seated to shut out any upward escape of fluid from the interior of the tank 11 as long as fluid pressure or liquid level conditions therein keep a ball valve element seated in the lower end of the inner shell, correspondingly as shown in FIG. 3.

As a further alternative construction, as indicated in phantom lines in FIG. 5, the ring 33a may be of lesser vertical height, thus to include on top thereof, a spacer flange member 46a, corresponding with the flange member 46 in FIG. 3. Such spacer member or ring 46a may be of outer diameter to be overextended by the cap 42, outwardly of the opening 43 therethrough. Optionally, the ring flange 46a may be of lesser outer diameter, but may have a flange part 45a upwardly that is overextended by the cap 42, as indicated in phantom lines in FIG. 5.

In the construction shown in FIGS. 3 and 4, the inner shell 37 remains seated within the outer shell 30 by its own weight, but could be blown out of position, as by great fluid pressure or explosion generated within the tank 11, so that the pressure fluid escape can take place between the respective outer and inner shells 30, 37, and under the manhole cover lid 23. On the other hand, with the construction shown in FIG. 5, in case of the build up of excessive fluid pressure within the tank 11, or in case of explosion, rupture of parts would have to take place, probably of the tapered part 38a. Thus either the construction shown in FIGS. 3 and 4 or the construction shown in FIG. 5 may be preferred, depending upon what degree of pressure build-up may be anticipated in particular services.

In fact, it is obvious that the hereinabove described invention may be practiced by structures other than those hereinabove described.

We claim:

1. In combination with a closure for a liquid vessel, as a milk truck tank, a valve including outer shell means having upwardly and inwardly and downwardly tapered part to seat on the inner edge of an externally threaded rim through said closure, and therebelow a tubular body providing fluid escape opening means through the upper portion thereof, and lowermost a frusto-conical lower part with smaller diameter open end downwardly, said valve also including an inner shell having upwardly a portion tapered inwardly and downwardly to seat within the tapered part of said outer shell means, and therebelow a tubular body concentric within said outer shell means tubular body with bottom flared outwardly to provide an upper valve seat, at least one of said outer shell tapered part and said inner shell tapered portion having a top flange thereon, a ball valve element of diameter to seat upwardly within said flared bottom and to seat downwardly within said frusto-conical lower part, a centrally open cap threadable upon said externally threaded rim, and to bear upon said top flange outwardly of said central opening to assemble said valve, whereby upward fluid movement within said tank seats said valve element upwardly to prevent fluid escape upwardly through said inner shell tubular body while said fluid may return outwardly through said opening means, and whereby upon the application of suction to withdraw the liquid from said tank, said ball element seats downwardly thus to permit air to be drawn down through said inner shell tubular body to pass upwardly between said tubular bodies and outwardly through said opening means, thus to relieve the creation of vacuum which otherwise would tend to pull in the wall of said tank.

2. A valve as claimed in claim 1, in which a manhole plate of said closure which provides said externally threaded rim, is included as an element thereof.

3. A valve as claimed in claim 1 in which said top flange comprises, separately, a spacer flange uppermost with flange member to be overextended by said cap, and an annular ring as top part of said outer shell and from the under side of which extends said inwardly and downwardly tapered part of said outer shell.

4. A valve as claimed in claim 1 in which said top flange comprises, integrally formed, a spacer flange that is overextended by said cap, and therebelow an annular ring from the under side of which extends said outer shell downwardly tapered part and said inner shell tapered portion.

5. A valve as claimed in claim 1 in which said fluid escape opening means comprise a plurality of fluid escape ports.

6. A valve as claimed in claim 1 in which the outermost diameter of said top flange is less than the root diameter of the external threads on said threaded rim through said closure, and in which the diameter of the opening through said centrally open cap is less than the outermost diameter of said top flange, whereby said cap may be inserted over said top flange to be threaded upon said external threads.

7. A valve as claimed in claim 1 in which said inner shell bottom is flared outwardly at an angle with relation to the diameter of said ball valve, whereby said ball valve seats within said inner shell above the lowermost edge of said flared bottom.

8. A valve as claimed in claim 1 in which said ball valve is of larger diameter than the smaller diameter open end of said outer shell frusto-conical lower part whereby said ball valve seats within said frusto-conical lower part above the smaller diameter lower end thereof.

9. A valve as claimed in claim 1 in which all elements thereof are of corrosion resistant material and resistant to chemical reaction with matters that may be carried in the liquid transported in said vessel.

10. A valve as claimed in claim 1, which additionally includes, as saleable parts thereof of said closure, a manhole cover plate in which said externally threaded rim is centrally disposed and a manhole cover lid hingeably installed upon said closure over said manhole cover plate and adapted to admit air under said lid and above said plate.